Patented June 8, 1954

2,680,723

UNITED STATES PATENT OFFICE 2,680,723

ORGANO-TITANATE REACTION PRODUCTS AND METHODS OF PREPARING SAME

Max Kronstein, New York, N. Y.

No Drawing. Application August 17, 1951, Serial No. 242,440

26 Claims. (Cl. 260—18)

This invention relates to organotitanate reaction products and methods of making same, and has particular relation to reaction products of saturated aliphatic titanates or aromatic titanates with fatty acid esters of polyhydric alcohols or silicone resins.

The titanates have the formula $Ti(OR)_4$, wherein R may be alkyl or aromatic, and are considered to be derivatives of $TiCl_4$ or organic esters of a titanic acid. The alkyl titanates have been found to be of limited practical value. They have been used in dilute solution as water-repellants for fabrics, but their use as coating vehicles has been limited because of their poor film-forming characteristics.

One object of the present invention is to provide a process for reacting saturated alkyl titanates with fatty acid esters of polyhydric alcohols or with silicone resins, so as to produce uniform reaction products which may be obtained as products which are soluble in the usual coal tar solvents and which may be either softened by the addition of plasticizers and oils, or hardened by combining with resinous compounds.

Another object is to provide such reaction products which are capable of forming a stable solution.

A further object is to produce such reaction products which can be modified in appearance by the addition of coloring matter, combined with paint pigments for use as coating materials, impregnating materials or paints.

Another object is to produce such reaction products which may be applied as coating or impregnating compounds in the form of a solution or in a fused form, and thereafter dried at about 100° C. to form insoluble, coherent film coatings, or which can be subjected to air drying to achieve film formation.

A further object is to produce such compounds which can be combined with oils, alkyd resins, phenolic resins, driers, plasticizers and their solutions, by either mixing or heating so as to produce novel coating compounds.

Still another object of the invention is to provide a method for producing such reaction products in gelled form, and may nevertheless be resolubilized into a soluble form by the method set forth in my Patent 2,476,879, which discloses a process for resolubilizing oil gels by heating with metal soaps. These and other objects of the present invention will be better understood by reference to the following examples, which serve to illustrate the nature and utility of the present method and reaction products.

In general, the present invention comprises a reaction product of saturated aliphatic or aromatic or alkyl aryl titanate and a fatty acid ester of a polyhydric alcohol or a silicone resin, or both, said components being reacted in the presence of an organoperoxide at a temperature sufficient to effect the release of free oxygen in the reactants. One of the preferred polyhydric alcohols comprises linseed oil, one of the preferred silicone resins comprises methyl phenyl silicone, one of the preferred organoperoxides comprises di-tertiary-butyl peroxide, and one of the preferred organotitanates comprises butyl titanate. Another preferred compound of the present invention comprises the reaction product of an organo titanate with both a fatty acid ester of a polyhydric alcohol and a silicone resin; for example, butyl titanate, soyabean oil and methyl phenyl silicone, reacted in the presence of an organoperoxide such as di-tertiary-butyl peroxide. The organoperoxide preferably comprises from about 1 to 25 percent by weight of the non-volatiles. When fatty acid esters of polyhydric alcohols comprise the sole reactant with the organotitanate, the preferred amount of organoperoxide comprises from about 2.4 to 20 percent by weight of the non-volatiles, and when silicone resins comprise the sole reactant, about 1.6 to 13.5 percent by weight thereof is preferred. When the organotitanate is reacted with a mixture of fatty acid esters of polyhydric alcohols and silicone resins, about 6 to 23 percent by weight thereof is preferred.

A reaction temperature range from about 90° to 220° C. has been found to give superior results, although the organoperoxides generally release free oxygen at temperatures from about 90° to 135° C. Thereafter the reaction is continued to a temperature of about 220° C.

The fatty acid esters of polyhydric alcohols used in this invention comprise esters of fatty acids having from 10 to 31 carbon atoms. Among the naturally occuring esters suitable for use are soybean oil, castor oil, linseed oil, China-wood oil, menhaden oil, isolene (synthetic dehydrated castor oil), lard oil, sperm oil, olive oil, sardine oil, safflower oil, candellila wax, carnauba wax and bees wax. Other esters include sorbitol esters of linseed oil fatty acids, ethylene glycol ricinoleate and ethylene glycol oleate. The fatty acids contained in these acids have for example from 10 to 20 carbon atoms in the sperm oil fatty acids, 25 to 31 carbon atoms in the bees wax fatty acids, 14 to 22 carbon atoms in the menhaden and sardine oil fatty acids and 24 to 26 carbon atoms in the carnauba wax acids.

The silicone resins employable in this invention comprise monovalent hydrocarbon poly-siloxane resins. By this term I mean poly-siloxane resins having mono-functional or monovalent hydrocarbon radicals; i. e. one or more hydrocarbon radicals bonded each by a single bond to the silicon atom. Among the poly-siloxane resins useful in the present invention are methyl phenyl polysiloxane resin, ethyl poly-siloxane resin, cyclohexenyl poly-siloxane resin and vinyl poly-siloxane resin. These poly-siloxane resins are referred to in the specification by their common names, namely silicone resins.

REACTION PRODUCTS OF ORGANOTITANATES WITH FATTY ACID ESTERS OF POLYHYDRIC ALCOHOLS

In the following examples, the oil and alkyl titanate were added together in the presence of the catalyst or prior to the addition of the catalyst and/or in the presence of volatiles. Heating was applied during the compounding or thereafter. Gas formation, evidencing the release of free oxygen, was observed at varying intensities and at different temperatures and heating rates depending upon the type and amounts of reactants employed. The heating was continued above gas formation temperatures (90–135° C.) to about 180 to 220° C. in accordance with the increase in degree of viscosity desired.

Example 1

(a) 20 parts by weight of butyl titanate were mixed with 10 parts by weight of a commercial dehydrated castor oil and with 3 parts by weight of t-butyl perbenzoate and were heated to around 140° C. until about 3 parts volatile substance from the catalyst had escaped. A darkened oil was obtained without the occurrence of gelling solidification.

(b) 30 parts of the product obtained under Example (a) were mixed with 3 additional parts of the same free-oxygen releasing catalyst and were heated up to 160° C. It was observed that no gelating occurred.

(c) The compound produced under Example (b) was modified by adding 12 additional parts of the same oil and 3 additional parts of the same catalyst and heated to 175° C. without gelation or solidification. The resulting compound was found to be capable of gelation, as shown in the following Example 2(c).

(d) 20 parts butyl titanate were mixed with 35 parts linseed oil (commercial grade Z-2) and with 5 parts t-butyl perbenzoate and the mixture was heated under stirring. At around 100 to 120° C. a reaction was observed and a uniform reddish oil was obtained which darkened around 150° C., at which point the escape of white vapors was observed. At around 160° C. a drop of the compound on a glass plate had a uniform clear appearance. Heating was discontinued around 170° C. without gelation having occurred and 54 parts of the resulting oil was dissolved in 65 g. benzol. A uniform solution was obtained which was applied to glass and sheet metal and baked at 100° C., a continuous coating being obtained.

(e) 16 parts butyl titanate were mixed with 43 parts China-wood oil and as a free oxygen releasing catalyst 6.5 parts t-butyl hydroperoxide were added. Upon heating, a heavy reaction occurred between 100 and 140° C. and a reddish uniform liquid was obtained, which was dissolved in 65 parts toluene and was used as a coating material. The coatings dried tack free at room temperatures and upon baking at around 110° C.

It should be noted that when China-wood oil is heated with a free-oxygen yielding catalyst in accordance with the method disclosed in my pending application S. N. 33,676, filed June 17, 1948, now Patent 2,599,297, issued June 3, 1952, gelation or solidification occurs; whereas, with the instant method utilizing an organotitanate, gelation or solidification may be avoided, although a quick drying, uniform coating material may be obtained with the instant method.

(f) 40 parts butyl titanate were mixed with 40 parts dehydrated castor oil and 6 parts di-tertiary butyl peroxide. Stirring failed to produce a clear mixture, but upon heating, the resulting compound became clear around 90° C. with a slightly red color. Slight gas formation was observed above 105° C. Heating was continued up to around 170° C., at which point a drop of the compound on a glass plate gave a clear transparent layer. 74.5 parts of the product were obtained and were dissolved in a 2:1 ratio in mineral spirits and did not gel on standing. The product was dried at 100° C. into a very hard film in the form of a coating.

(g) 20 parts of animal oil, light menhaden fish oil, were mixed with 7 parts butyl titanate and a mixture of 2 parts t-butyl hydroperoxide and 0.7 part di-tertiary butyl peroxide. On heating, a very strong reaction occurred around 100 and 130° C. Heating was continued to about 180° C. A clearly soluble product was obtained (one part dissolved in 0.8 part VM&P naphtha).

(h) 15 parts of tetracyclohexyl titanate were mixed with 15 parts China-wood oil and 2 parts t-butyl perbenzoate were added. The mixture was heated slowly. At about and above 130° C., a dark uniform oil was formed under slow gas development. Heating was continued to and above 200° C. for about ten minutes. Three grams substance had escaped and the compound was dissolved (1:1) in xylene. The resulting clear and stable solution did not show precipitation or gelling upon standing in a glass container for 24 hours. When coated on a steel panel in 50 minutes at 100° C., a coherent film was obtained.

(i) 31 parts of a commercial chemically isomerized synthetic oil (isolene oil, a dehydrated castor oil of the Woburn Chemical Co.) were mixed with 5.5 parts of butyl titanate and 5.5 parts of tetracyclohexyl titanate. 4 parts of a 1-hydroxy-cyclo-hexyl-hydroperoxide-1 were added and at room temperature no homogeneous mixture was obtainable. On heating, a clear, somewhat reddish, uniform mass was obtained above 100° C. and around 120° C. A drop spread over a cool glass plate formed a uniform transparent viscous layer. Heating was continued up around 150° C.

One part of the product was dissolved (1:1) in xylene and a clear and stable solution was obtained. This solution was clearly miscible (1 part by volume to 1 part by volume) with China-wood oil; 0.5% of a drier solution, cobalt naphthenate liquid (6% Co), was added and when coated on a glass plate a clear transparent layer was obtained. On heating this layer at 100° C., a wrinkle finish was obtained which was comparable to other China-wood oil base coating compounds.

(k) 20 parts soybean oil were mixed with 10 parts tetracyclohexyl titanate and 1.5 parts p-chlorobenzoyl peroxide was added. This mixture was heated gradually under slight gas formation up to 195° C. and a dark brown oil was obtained. This oil was clearly soluble (1 part to 3 parts) in heavy mineral oil. This solution was clearly miscible in the proportion 2:1 with a resinous oil and clear stable solutions were obtainable therewith.

(*l*) 10 parts butyl titanate and 10 parts lard oil, a non drying animal oil, were mixed with 5 parts xylol and 2 parts "Uniperox 60" (a commercial liquid organic hydroperoxide in about 60/65% solution with alcohols and ketones of about the same boiling range as admixture and composed mainly of cyclic hydrocarbon hydroperoxides containing six to eight carbon atoms and having an empirical formula $C_7H_{13}OOH$) were added. Strong reaction began at 110° C. and continued up to about 170° C. Heating was discontinued at 190° C. and a reddish oil was obtained. 7 g. volatile matter had evaporated.

The new compound was soluble (1:1) in "Dekalin" (decahydronaphthalene, a commercial solvent of the empirical formula $C_{10}H_{18}$, a saturated aromatic hydrocarbon). This solution was miscible 1:2 with hexane without precipitation.

(*m*) Another organo titanate, having aliphatic groups was used:

15.5 g. tetra isopropyl titanate were mixed with 19 g. winter sperm oil and 3 g. di-tertiary butyl peroxide were added. The resulting material had a slight tendency to fume at room temperature. On heating up to 138° C., strong white fumes were formed and 5 g. material escaped. A slight reddish mass formed which was soluble in petroleum solvent. No precipitation occurred upon adding as much as 3 parts of solvent to 1 part of the compound.

(*n*) The process of Example (*m*) above was repeated using the same titanate with boiled linseed oil mixed with 5 g. tetra isoproply titanate and 1 g. acetyl peroxide. The material was heated up to 145° C. and a red brown fluid was obtained which was soluble in mineral spirit and gave a clear flow on a glass plate and which dried at 100° C. over night into a transparent dry film.

(*o*) In another modification, 17 parts of a non drying vegetable oil, olive oil, were mixed with 10 parts tetra isopropyl titanate and 2 parts t-butyl perbenzoate. Heat was applied and vapors were formed at around and above 90° C. Heating was continued to 140° C., resulting in a reddish-yellow oil with a tendency to a slight surface skin formation. The reaction product was found to be soluble (1:1) in benzol.

(*p*) 25 parts of sardine oil (LCP 40°) were mixed with 21 parts of a 1:1 mixture of two organotitanates; namely, tetra isopropyl titanate and butyl titanate. 3.5 parts 1-butyl hydroperoxide were added and heat was applied. Strong fuming occurred around 100 to 120° C. Heating was discontinued around 160° C. and the liquid was thinned (1:1) with toluene. A brown-reddish solution was obtained. Adding 1:1 hexane did not cause precipitation of the solution.

(*q*) 15 parts sorbitol-soybean oil fatty acid ester (a synthetic oil produced by the Atlas Powder Co., G–876) were mixed with 5 parts tetra isopropyl titanate and 1.5 parts granular p-chlorobenzoyl peroxide were added. Upon heating to around 90° C., strong foaming began. Heating was continued up to 150° C. and a uniform light brownish oil was obtained which was soluble in mineral spirits.

(*r*) Using another aromatic alkyl titanate, the phenyl titanate, which is at room temperature a solid mass. Using a smaller quantity; that is, 20 parts phenyl titanate, softened at 100° C. in an oven, were heated with 21 parts boiled linseed oil and 2 parts of an organic peroxide (Uniperox). At around 100° C., a brownish mass was formed. Heating was continued up to around 150° C. and a heavy viscous oil was obtained which was soluble in xylene.

(*s*) 10 parts phenyl titanate were slowly melted and mixed with 11 parts soybean oil and 1.8 parts tertiary butyl hydroperoxide were added. On heating around 120° C., a dark, uniform compound was obtained which was soluble in petroleum solvent.

(*t*) 11 parts of the synthetic oil used in Example (*g*) above were mixed by slow melting with 9 parts phenyl titanate at around 90 to 100° C.

2 parts di-tertiary butyl peroxide were added and heated. Gas development was strong around and above 100° C. Heating was continued up to 150° C. at which point 2 g. volatile matter had escaped. 3.5 parts of the resulting uniform, dark melt was dissolved (1:1) in benzol and a clear solution was obtained.

(*u*) 5 parts phenyl titanate were slowly melted with a mixture of 5 parts of a semidrying vegetable oil (safflower oil) and 1.5 parts of a nondrying fish oil (sardine oil). A cloudy product was obtained upon adding 0.9 part of the diacyl peroxide of lauric acid (commercial Alperox C), which, upon heating, turned into a clear melt. Heating was discontinued around 120° C. The melt gave a clear drop on glass and was soluble in mineral spirits.

(*v*) 13 parts menhaden fish oil were mixed with 11 parts butyl titanate and 2.5 parts of 60% methyl ethyl ketone peroxide in dimethyl phthalate (commercial Lupersol DDM). On heating to 80° C., the mixture became clear before all the oxygen had been released.

(*w*) 1. 11.5 parts butyl titanate (viscosity of 8 poises) were mixed with 10 parts bodied linseed oil. 1.2 parts cumene hydroperoxide (74.9%) were added. On heating up to 120° C., a clear melt which was soluble in toluene was obtained.

2. 17.5 g. safflower oil, a semi-drying oil, were mixed with 12.5 g. butyl titanate and 1.8 g. cumene hydroperoxide. At 130° C., a clear and soluble product was obtained. The example was repeated at 65° C. 14 parts safflower oil were mixed with 13 parts butyl titanate and 2 parts cumene hydroperoxide. Heating was limited to the point when the first gas bubbles began (65° C.) and the vessel was held at that temperature for 5 minutes.

3. 12 parts soybean oil and 10 parts butyl titanate were mixed with 0.5 part cumene hydroperoxide and reacted at the initial gas bubble temperature (65°). A clear product was obtained.

(*y*) 1.12 parts candelilla wax were melted, and at a temperature of 75° C., 10 parts butyl titanate were added, along with 1.7 parts of 60% methyl ethyl ketone peroxide (in dimethyl phthalate). Heating was discontinued and the temperature rose from 75° C. to 100° C. As soon as cooling began, the mixture was heated up to 140° C. The mass was then dissolved in xylol (about 1:1.2) and a clear solution resulted. On cooling, a slight waxy cloud was observed.

2. 15 parts carnauba wax (clear, light type) were melted, 10 parts of butyl titanate were added, and 1 part t-butyl perbenzoate were used. On heating to 135° C., a uniform melt was obtained which was uniformly soluble in warm toluene.

3. 14.5 parts of a synthetic wax-like substance, ethylene glycol (mono) ricinoleate (commercial type S–152, Glyco Products Co.) were mixed with 11.5 parts butyl titanate and 1.5 parts cumene hydroperoxide (techn. 75%) heated up to around 120° C. A uniform product was obtained and dissolved (1:1) in xylol. The resulting warm solution was clear and on cooling, a soft wax-condition was obtained.

4. 10 parts polyethylene glycol di-oleate (S. 1011, Glyco Products) were mixed with 9 parts butyl titanate and 1 part di-tertiary butyl peroxide were added. On warming, two layers were observed, but a uniform wax substance was obtained at around 90° C. to 100° C. under the effect of the peroxide.

*Example 2.—Compounding an alkyl titanate and a polyhydric fatty acid ester into a gel*

It is shown in the present example that gelling can be accomplished and a product can be produced which will be suitable for resolubilization as an oil gel if treated in accordance with the method disclosed and claimed in U. S. Patent 2,476,879.

(a) 44 parts of a reaction product obtained in accordance with Example 1(c) were mixed with 13 parts of the same synthetic oil, heated with 4 parts of the same catalyst under occasional stirring. Between 170° and 180° C. gelling occurred. This gel was applied hot to a glass plate and baked on at 100° C. during several hours into a coherent film.

Another part was swollen into hot toluene (1:1) into a liquid appearance. The compound gelled on cooling. Baked onto a glass plate, it formed a coherent film.

(b) 29 parts butyl titanate were mixed with 5.2 parts t-butyl perbenzoate and heated. At around 100° C. some reaction and gas formation was observed. Heating was continued to around 189° C. to 190° C., at which point a resinification occurred. On cooling, a brittle resin was obtained. No gelation was observed.

(c) 15 parts tetra cyclohexyl titanate were mixed with 15 parts tung oil and 3 parts t-butyl perbenzoate and quickly heated to about 160° C., whereby darkening occurred and the temperature increased under gas development up to and above 200° C. Three grams of substance had evaporated during the procedure. The compound was allowed to cool to about 70° C. and 2 more parts of the catalyst were added. Heating was applied to about 160° C. A strong reaction was observed, and the temperature raised rapidly to above 220° C. Heating was continued under stirring up to 260° C., whereby a brown, somewhat smeary gel was obtained which was at least partially insoluble in hot xylene. 6.5 grams of volatiles evaporated during the reaction.

(d) 22.8 parts of the synthetic oil used in Example 1(g) were mixed with 9.2 parts butyl titanate and 2 parts tetra isopropyl titanate and heated with 3 parts t-butyl hydroperoxide. A strong reaction occurred around and above 110° C. Gelling occurred at 175° C.

(e) 18 parts of the linseed oil-phenyl titanate compound, as produced in Example 1(r), were heated with 2 parts of the same peroxide and at 130° C., gas formation was observed. Gelling occurred at around 180° C.

(f) 1. 18.2 parts of the candelilla wax-organotitanate compound of Example 1(y-1) were treated with 1.8 parts methyl ethyl ketone peroxide (60%). Around 120° C., strong foaming occurred and a solid gel was obtained.

2. 21.5 parts ethylene glycol mono-ricinoleate organo-titanate compound produced in Example 1(y-3) were treated by heating with 2 parts of cumene hydroperoxide (75% tech.). Around 145° C., solidification occurred.

(g) 23 parts industrial "accelerated linseed oil" (Castung 504—Z-3, Baker Co.) were mixed with 11 parts butyl titanate and 2 parts di-tertiary butyl peroxide were added. On heating, the mass became uniform around 110° C. On quick heating up to around 215° C., a strong gel was formed, which, on cooling, had a tendency toward brittleness.

*Example 3.—Resolubilizing the alkyl titanate-polyhydric alcohol fatty acid ester gel*

(a) The gel produced in Example 2(a) was resolubilized by heating with a metal soap catalyst as follows:

50 parts of the gel were swollen in 50 parts hot toluene, and this product was mixed with 14 parts of a standard lead naphthenate liquid (24% Pb). On heating, the volatile solvent escaped and the remaining mass was further heated to about 160° C., at which point a tough, high viscous state was observed. 5 more parts of the same metal soap catalyst were added. On heating, a thin melt was obtained around 180° C. This was soluble 1:1 in toluene, and on applying this clear solution to a glass plate, a clear film was obtained by baking at 100° C. for 2 hours.

(b) The gel produced in Example 2(c) was resolubilized as follows:

25 parts of the gel were mixed with 7 parts lead octoate liquid (24% Pb). On holding the mixture at around and above 170° C., the 2.8 parts solvent contained in the liquid commercial metal soap evaporated and the gel melted into a uniform liquid state. This was dissolved 1:1 in xylene and filtered. Less than 1.5 g. swollen surface skin were found. The other 23.5 g. of the gel had clearly been dissolved and the solution remained clear on standing for 24 hours. Applied as a coating on steel and dried at 100° C., a coherent film with glossy appearance was obtained.

(c) The gel produced in Example 2(d) was resolubilized as follows:

10 parts of the gel were resolubilized by heating with 4 parts copperoleate in the presence of 1 part synthetic isomerized castor oil (commercial Dienol OC 101, Oil Chemie Inc., Hausen, Switzerland). Fusing occurred around 155 and 210° C. Heating was continued under stirring up to 225° C. and the mixture was obtained as a uniform fused compound which was soluble and stable in a 1:1 xylene solution.

(d) 18 parts of the gel produced in Example 2(e) were reliquefied by fusing with 6 parts of a metal soap solution (commercial cobalt naphthenate, 6% Co). Uniform melting occurred around 130° C. Heating was continued up to 185° C. About 2.4 g. of volatile matter evaporated from the solution, and the liquid melt was dissolved in 18 g. xylene. A uniform, fully resolubilized product was obtained.

(e) An excess amount of organotitanate is used, such surplus being detected after resolubilization of the gel in the form of granular, insoluble particles which are identical to those obtainable by heating an alkyl titanate with an organoperoxide. In the following experiments, the percent of organotitanate was further increased to 1.5 parts (2 parts for 2 parts of oil):

1. 24 parts bodied linseed oil were mixed with 14 parts butyl titanate and 3 parts 1-hydroxy cyclohexyl hydro peroxide-1 were used. A strong reaction occurred around 130° C. and strong gelling occurred at 175° C., resulting in a resinous jelly appearance. Upon adding 14 parts of a cobalt tall oil metal soap liquid commercial Co Nuolate with 6% Co) and heating again, melting occurred between 150° C. and 210° C. under stirring. On thinning, about 2 g. of a granular, undissolved matter was found which was identified as a derivate of the excess organotitanate.

2. The test was repeated using the same amount di-tertiary butyl peroxide as catalyst and using 6 g. manganese linoleate as the metal soap. Melting occurred around and above 160° C., and about 1.8 g. granular matter remained on filtering.

(f) 36 g. of the gelled accelerated linseed oil-butyl titanate reaction product of Example 2(g) was heated with 18 parts of a lithium-resin soap, prepared by melting 30 parts wood rosin and gradually adding 5 parts lithium carbonate, and continuing the heating until foaming receded, followed by heating up to 225° C. The gel-rosin soap mixture was heated under stirring until a clear melt had been obtained around 235° C. The product was dissolved in 50 parts xylol under heating. On filtering through cotton cloth, less than 0.5 g. of a slight skin remained on the cloth. A clear solution was obtained.

1. The candelilla wax-organotitanate gel of Example 2(f-1) was reliquified by heating 18.2 parts with 18 parts liquid zinc naphthenate (8% Zn) up to 225° C.–230° C., until melting had occurred. The melt was dissolved in 20 parts xylol. Less than 0.5 part undissolved matter remained on the filter cloth. In warm condition, a clear solution was obtained which, on cooling, exhibited a waxy appearance.

2. 21.5 parts synthetic wax-organotitanate gelled solids of Example 2(f-2) were reliquified by heating with 13 parts lead oleate up to around 240° C., at which point melting occurred. The melt was dissolved in 22 parts xylol. The initially clear solution turned to a slightly waxy appearance on standing.

(g) 15 parts of an organotitanate oil gel were prepared by rapidly heating a mixture of 15 parts bodied linseed oil and 10 parts butyl titanate with 2.5 parts organoperoxide (methyl ethyl ketone peroxide, 60% in dimethyl phthalate) up to around 140° C., at which point gelling occurred. 15 parts of the gel were resolubilized by heating with 10 parts lead soap (prepared by heating 15 parts candelilla wax with 5 parts lead acetate up to 145° C.) under stirring up to about 195° C. The resulting melt was dissolved in 2.5 parts hot toluene. On cooling, the resulting solution had a waxy appearance. On warming up to around 50° C. to 70° C., the solution became clear and on cooling, the material again returned to a soft, soluble and fusible wax.

1. 12.5 parts beeswax were melted and mixed with 10 parts butyl titanate. 2.5 parts tertiary-butyl perbenzoate were added. On heating, strong foaming occurred above 110° C. On heating up to 155° C., a uniform melt was obtained. In a second step, 2 parts of perbenzoate were added after cooling the melt to about 100° C. On heating up to about 185° C., the uniform melt remained stable and no gelling occurred. After cooling to about 90° C., one part perbenzoate was added, and on heating up to 190° C., a coherent gel was obtained which was similar to oil-gels and formed a long and coherent thread of gel substance when dropped in drop form from a glass rod.

20 parts of this gel were resolubilized by heating with 10 parts of a metal soap product derived from wax. The latter was prepared by heating 18.5 parts beeswax with 5 parts manganese acetate. After foaming (around 100° C.), heating was slowly continued to 215° C. On heating the beeswaxy-organotitanate gel with the beeswax metal soap up to 225° C., a clear melt was obtained. Drops thereof did not show a gel-like behavior, but fell individually without a streak formation. The reaction product was fully soluble in 30 parts hot toluene. On cooling, the solution showed a wax-like cloudy appearance, but no gelling of the solution occurred.

*Example 4.—Compounding an alkyl titanate with a silicone resin material*

Examples of the compounding of silicone resins with alkyl titanates in the presence of free oxygen-releasing, organoperoxides are as follows:

(a) 21 parts butyl titanate were added to 30.5 parts of a 60% commercial methyl phenyl silicone resin (Dow Corning product DC 801) identifiable as a phenyl methyl polysiloxane, which is highly substituted and therefore, relatively flexible and thermoplastic. 4.5 g. p-chloro benzoyl peroxide were added. On heating the mixture slowly under stirring, foam formation was observed around 100° C. At 120° C. a clear brownish solution was obtained. Heating was discontinued around 170° C. The loss in weight was 15 g. which corresponded approximately to the solvent content of the silicone material and the volatile substance of the peroxide.

On standing, the substance showed a slight tendency to form a thin surface skin. It was diluted (1:1) in toluene, applied to a glass plate, baked for 20 hours at 100° C., and a clear film was obtained having Sward Hardness 58.

The solution was further modified by mixing 20 parts of the 50% toluene solution with 5 parts tung oil, and a clear and stable solution was obtained. This was applied to a glass plate and baked at 100° C. for 20 hours. The film showed at some areas the usual slight wrinkle effect of tung oil varnishes. On other areas, a clear film was obtained having Sward Hardness 34.

This solution also was mixed with a pigmented phenolic resin varnish in the proportion of 3 parts to 1 part of the pigmented varnish. This varnish was a pure phenolic tung oil varnish, produced from 25 parts phenolic resin (Bakelite BR 254) with 24.5 parts tung oil at around 450° F., thinned with 49.5 parts xylene and modified with 0.05% lead and 0.006% cobalt-naphthenate driers calculated on the oil. In pigmentation, 400 parts of this phenolic varnish were thinned with 20 parts xylene and 75 C. P. toluidine toner.

This colored modification of the silicone resin-alkyl titanate compound with a phenolic resin tung oil varnish and pigmentation was applied to a steel panel, dried at 50° C. overnight and had a Sward Hardness 30. Applied on wood treated with a shellac solution as filler, a colored, semi-glossy film was obtained.

The product was compared with the untreated silicone resin solution as follows:

(1) Both solutions were applied to steel panels and dried at 100° C. for 18 hours. The initial silicone resin remained uncured and very tacky. The new product had formed a dry and fully tack-free coating.

(2) Both solutions were mixed with tung oil (2:1). The initial silicone solution was not compatible with the oil, and in a very few minutes a brownish precipitation was formed. The new compound formed a stable clear solution.

(b) 17 parts butyl titanate were mixed with 30 parts of a 60% commercial methyl phenyl silicone resin (DC 804) and 5 parts di-tertiary-butyl peroxide were added. On mixing, a transparent gelly precipitate occurred. This silicone is identifiable as a phenyl methyl polysiloxane, which is of lower substitution, and relatively rigid and thermosetting. On heating, foaming began around 65° C., and was strong at around 125° C. A uniform solution was obtained. On heating up to around 175° C., a light colored melt was obtained, being in color lighter than the commercial silicone resin DC 801 used in Example 4(a). 17 parts volatile solvent and catalyst material had escaped. The reaction product was thinned with toluene (1:1) and a clear, light brownish liquid was obtained.

This solution was miscible with tung oil (2 parts new solution and 1 part tung oil). The commercial silicone resin solution (DC 804), thinned to the same 50% concentration, formed with tung oil a colored jelly precipitation, on standing for a few hours.

The new products produced in Examples (a) and (b) were compared as coating compounds with the silicone resins DC 801 and DC 804 in 50% toluene solutions. All four were applied to steel panels and baked at 100° C. After 18 hours, both silicone resins were very tacky. Both titanate compounds were dry and fully tack-free.

After 42 hours the silicone coating (DC 801) had at room temperature a Sward Hardness 16. Its alkyl titanate compound made a Sward Hardness 44. The silicone coating (DC 804) had at room temperature a Sward Hardness 46, and its titanate compound had a Sward Hardness 44. When tested again at 100° C. the DC 804 silicone had softened to 36, and the alkyl titanate compound had softened to 42, thus indicating the improved curing characteristics of the new compounds.

(c) 20.2 parts of a solution of phenyl methyl polysiloxane (DC 803, which is relatively reactive and quick drying), 50% in Ennjay 3 solvent and toluene, were mixed with 7 parts butyl titanate and with 2.7 parts tertiary-butyl hydroperoxide and stirred. A jelly colorless mass was obtained. On heating to around 90° C., the temperature went up rapidly to around 106° C., and a gelled, popcorn-like solid product was formed.

1. On mixing 20 parts commercial DC 803 solution (50%) with 8.1 parts butyl titanate and stirring, a jelly mass was obtained. On adding 0.3 part tertiary-butyl-hydroperoxide with 0.4 part toluene as diluent and heating slowly, the substance became progressively more uniform. Around 170° C., a clear, slightly reddish colored melt was obtained, which formed (1 part melt and 1.2 parts benzol) a clear and stable solution in 1.2 parts benzol. In contrast to the initial DC 803 solution, the new solution was clearly miscible with butyl titanate.

(d) 30 parts of ethyl silicone resin (commercial C-25, 50% solution) which had gelled in storage to a tough, coherent gel, not capable of being diluted clearly, were mixed with 10 parts butyl titanate. 0.9 part 1-hydroxy cyclohexyl hydroperoxide-1, a macrogranular commercial product, was added. On heating the mixture slowly, a very tough jelly mass was formed around 60° C. and the granular peroxide melted into the mass under slight gas development. At 80° C. the gas development increased, the gel softened, and the temperature rose rapidly to 115° C. Heating was continued to about 140° C. The product was substantially completely dissolved (1:2) in benzol, with only a very few popcorn-like particles remaining on the filter. The solution was applied to an aluminum panel and dried overnight at 150° C. into a tough, dry coating.

1-A. 21 parts butyl titanate were mixed with 10 parts cyclohexenyl-polysiloxane (commercial X-32), 45% solution, and with 10 parts ethyl silicone resin (C-25) in 50% solution, and an incompatible jelly-like mass was obtained. 1.2 parts di-teritary-butyl-peroxide were added. On heating up to 140° C., foaming was observed. A clear liquid was formed which was (32 parts) dissolved in toluene (32:22) and a clear transparent solution was obtained.

1-B. 20 parts butyl titanate were mixed with 13.5 parts ethyl silicone resin (50% solution of commercial C-25) and with 8.5 parts methyl phenyl silicone resin (60% solution of commercial DC-801). On mixing, a jelly-like precipitation was observed. 2 parts of xylene were added with 1.7 parts tertiary-butyl-perbenzoate. The mixture was heated, and slight foaming occurred around 90° C., with the jelly mass becoming more and more uniform. Under stirring a clear fused state was reached around 110° to 120° C. A part of the product was dissolved in toluene (1:1) and a yellowish-colored clear solution was obtained which remained stable for 30 hours.

1-C. To 28 parts of the fused product of Example 4(d) 1-B, were added 5 parts lard oil, along with 0.4 part tertiary-butyl-perbenzoate. After mixing, a drop taken out with a glass rod fell with jelly-like appearance. Heat was applied, and between 90° C. and 100° C., a clear fused state was observed. The product was heated to about 145° C. under foaming. About 2 parts volatile matter evaporated. The product was dissolved in 24 parts toluene, and a clear reddish solution was obtained which remained stable and showed no precipitation after 30 hours standing at room temperature.

1-D. 15 parts butyl titanate were mixed with 13 parts ethyl silicone resin (50% solution) and one part cumene hydroperoxide (74.9%). 2 parts xylene were added for better dispersion of the peroxide. On mixing, a jelly-like incompatible mixture was obtained. On heating slowly up to 120° C., the mass became uniform, liquid and transparent. It dissolved in 20 parts toluene without residue.

2. 20 parts of a shelf-aged, strongly gelled, 60% commercial silicone resin (DC 801) were mechanically mixed with 6 parts butyl titanate, and 0.6 part fine powdered 95% benzoyl peroxide (with 5% stearic acid) were added. The mixture began to melt at around 140° C., and heating was continued to 190° C. A few particles remained unfused, and the amount of alkyl titanate was somewhat increased by adding 0.6 part butyl titanate, and the heating was repeated. The reaction product was dissolved in 11 parts solvent, or tetra-hydro-naphthalene solvent, and further diluted with 4 parts xylene. The product was completely soluble with the exception of 0.5 part undissolved popcorn-like substance. On an aluminum slate at 100° C. overnight, the clear solution produced a tough coating which was tack-free even at the oven temperature.

3. 20.5 parts butyl titanate were mixed (similar to A) with 11 parts C-25 ethyl silicone resin (50% solution). 1.5 parts of commercial methyl ethyl ketone peroxide (60%), commercial Lupersol DDM, were added. On stirring, a jelly-like, irregular mass was obtained. Slow heating under occasional stirring around 125° C. to 130° C. developed a uniform melt. Heating was continued until a clear liquid state had been reached at around 170° C. A sample was dissolved in xylene and formed a clear solution. On cooling, the melt itself had a tendency to form a thin surface skin.

4. To 20 parts of the product from 3 supra, 5 parts of a polyhydric alcohol fatty acid ester oil, teaseed oil, were added. At around 70° C., one part of the same peroxide was added. The temperature rose quickly to about 100° C. under foaming. After the reaction slowed down somewhat, heat was applied to about 130° C., and the product was dissolved in 30 parts toluene. A clear solution was obtained. On filtering, less than 0.5 part thin skin was recovered.

5. 32 parts butyl titanate were mixed with 13 parts vegetable oil (soybean oil) and with 17.5 parts (C-25) ethyl silicone resin solution (50%). 3.5 parts tertiary-butyl-hydroperoxide were added. On mixing, a jelly mass was observed. Heat was applied. Around 110° C. some gel matter remained. Under some foam development and stirring the heating was continued to around 135° C. The mass was primarily uniform, and at about 160° C., a completely uniform melt was obtained which dissolved (53:40) in toluene, to give a clear, completely dissolved product. The solution was observed after several hours of standing at room temperature, and remained clear.

(e) 21 parts commercial silicone resin, DC 801 (60% solution), were mixed with 10 parts tetra-cyclohexyl titanate. The mixture was not compatible. 3 parts tertiary-butyl perbenzoate were added and the mass was heated. Foaming occurred near and above 100° C. and the product became a uniform liquid. The foaming increased on continued heating, not only due to the peroxide, but also due to the escape of the volatile solvent. 5 g. substance evaporated. Heating was ended around 165° C. and the product was dissolved (1:1) in xylene. A clear stable solution was obtained. As a coating material, it dried in 90 minutes at 100° C. into a tack-free coating on a steel panel.

(f) 21 parts of a commercial methyl phenyl silicone resin (DC 996), 50% solids, were mixed with 9.5 parts tetra-cyclohexanol titanate and a mixture of peroxides comprising 1 part tertiary-butyl perbenzoate and 0.5 part acetyl peroxide (in dimethyl phthalate). Strong foaming occurred around 100° C. to 120° C. Heating was continued to around 180° C. 20 parts of a reddish compound were obtained, which compound was fully soluble (1:1) in toluene.

This solution was further diluted (1:2) with xylol, and then again (1:0.5) with butyl titanate, and then (1:1) with dehydrated castor oil. It was not possible to mix it (1:1) with a silicone solution, DC 996 (50% solids), because of gel precipitation such that additional treatment with organoperoxide would have been required.

(g) A commercial thermoplastic methyl phenyl silicone resin (9989-1, General Electric) was mixed with 5 parts butyl titanate and 2 parts of a volatile VMP naphtha was added for ease of mixing. The mix was not uniform. 2 parts of commercial organic cyclic hydrocarbon hydroperoxide (Uniperox 60) were added. Strong foaming occurred, especially above 110° C. and around 130° C. to 150° C. Heating was discontinued around 170° C. 7 parts volatile matter had escaped. The uniform compound was dissolved in 17 parts Decalin (decahydronaphthalene). This uniform solution was not compatible without additional treatment when mixed with soybean oil (1:2). It was clearly soluble (1:1) in xylene, and 1 part of the initial silicone resin (9989-1) was added without precipitation. The uniform solution was clearly miscible with amyl triethoxy silane (1:0.8), as well as (1:1) with butyl titanate and with a mixture thereof.

(h) A silicone resin and tetra-isopropyl titanate were compounded directly by mixing 40 g. silicone resin (9989-1, General Electric) with 15 parts tetra-isopropyl titanate, whereby a jelly-like condition was obtained. 2.8 g. tertiary-butyl hydroperoxide were added, and the mixture was heated slowly. At above 80° C., slight boiling was seen which became stronger at and above 95° C. The heating was continued to around 120° C. 10 g. volatile matter had escaped from the peroxide, and the solvent which was part of the commercial resin solution. 25 g. xylene was added and a straw colored solution was obtained which gave on glass a clear, transparent flowout. It was baked at 100° C. and was dry to the touch in about 20 minutes. After 16 hours at 100° C., it was very hard and was not scratched by the fingernail.

1. The product of Example 4(h) was plasticized by mixing (1:1) with tricresyl-phosphate. To butyl titanate was added (1:2) this product, and a clear solution was obtained on mixing. This was modified by further diluting with xylene (1:1). The solution was applied on a glass plate and baked at 10° C. for four hours. A dry film was obtained which had a slight cloudiness along the edges.

(i) 20 parts phenyl titanate, a hard mass at room temperature, were slowly melted in 30 parts silicone resin solution (9989-1, General Electric). A yellowish-red suspension was obtained. 3 parts di-tertiary butyl peroxide were added and the mixture was slowly heated until warm (around 150° C.), and a clear fused liquid resulted. A sample was clear and soluble (1:1) in toluene, and gave a clear, transparent flowout. On cooling, a yellowish cloud was observed which apparently was caused by a slight surplus of phenyl titanate.

1. The product of Example 4(i) above was combined with 12 g. of a synthetic bodied oil (commercial Neo Fat 290 of the Armour Company), less 3 g. used for solubility test, and 2 parts of the same peroxide. Heating to around 150° C. caused strong foaming, whereby a product was obtained which was not only soluble in hot toluene, but which remained a clear, transparent reddish-brown solution on cooling to room temperature and standing for several hours. The slight surplus of phenyl titanate appeared to have been used in this step of the reaction.

2. The preceding test was repeated, using somewhat more titanate. 20 parts phenyl titanate were mixed and melted in 24 parts of the same commercial silicone resin (General Electric 9989-1) and 2.8 parts di-tertiary butyl peroxide was added. Gas development began around 120° C., and became stronger around 140° C. Heating was continued to around 170° C., when only a relatively slight yellow cloud remained in the fused material. 12 parts volatile matter had escaped. One part of the material was dissolved in xylene (1:1) and a stronger cloud was found than in Example 4(i) above. However, the material baked at 100° C. in two hours into a coherent film.

3. 18 parts of the preceding reaction product (without solvent) were further heated with 5 parts of the synthetic oil as used in Example 4(i-1) above, and 1 part di-tertiary butyl peroxide was added. On heating up to 180° C., 1.4 g. volatile matter escaped and the substance in toluene (1:1) gave a clear solution which baked in two hours on a glass plate at 100° C. into a clear, hard film.

4. The silicone-alkyltitanate oil compound in toluene obtained from Example 4(i-1) was mixed with that from Example 4(i-3) and they were found to be miscible. The mixture was diluted with xylene (1:1) and again a clear solution was obtained. This solution was mixed with soybean oil (2:1) and a clear solution was obtained on shaking.

For comparison, the initial commercial silicone resin solution (General Electric 9989-1) was diluted with xylene (1:1) and soybean oil (2:1) was added. On shaking, a flocky precipitate was formed, thereby evidencing that the silicone resin had reacted and had been modified in the processes of Examples 4(i-1) and (i-3) above.

(k) 30.5 parts methyl phenyl silicone resin (General Electric 81182), 60% solids in xylene, were mixed with 12 parts butyl titanate. On mixing, a slight gel was obtained. 2.1 parts methyl ethyl ketone peroxide (60% in dimethyl phthalate) were added and the mixture was heated. Around 80° C., strong foaming occurred. On heating to about 110° C., some darkening occurred and 2.5 parts volatile matter escaped. The compound was thinned with 10 parts toluene and a clear reddish solution was obtained. It was modified by adding (1:1.5) cyclo-hexenyl polysiloxane (X 32), 45% in toluene, and remained clear.

(l) 10 g. butyl titanate were mixed with 10 g. cyclo-hexenyl polysiloxane (Linde Silicone X-32), 45% solution in toluene. 1.8 g. cumene hydroperoxide were added and the mixture was slowly heated under mixing. The product turned uniform at around 40° C. and became light in color, indicating that a reaction was under way. At 130° C. a light brown product was obtained which was dissolved in 10 g. xylene and remained stable overnight.

(m) 9.5 g. butyl titanate were mixed with 10 g. vinyl polysiloxane (Linde's Silicone X-31 in 50% toluene solution) and 1 g. cumene hydroperoxide were added. On stirring, a gel was obtained. On carefully heating under stirring, the gel began to disappear around 35° C. At 45° C., the heating was discontinued, but the mixture continued to rise in temperature up to 60° C. A clear product was obtained which was fully soluble and stable in 10 g. xylene.

12 g. butyl titanate were mixed with 11.4 g. vinyl polysiloxane and 1.5 g. cumene hydroperoxide. The mass was clear and uniform on heating to around 80° C., but at around 100° C., it turned instantaneously into a solid, insoluble and incoherent state, as described in my Serial No. 33,676, thereby illustrating the secondary reaction caused by the vinyl group.

*Example 5.—Compounding the reaction products of Example 1 with a silicone resin*

It has been shown in Example 1 that alkyl titanates and oils, etc., form reaction products which can be modified by mixing them with other oils, alkyd resins, etc. It has been shown in Example 4 that alkyl titanates and silicone resins form reaction products which can be modified by mixing with oils, varnishes, driers, etc.

The present example is concerned with the compounding of the reaction products of Example 1 with silicone resins and silicone resin compounds in the presence of free oxygen releasing organoperoxides.

(a) 10 parts of the reaction product on Example 1(i) were dissolved in 20 parts of a commercial silicone resin varnish (DC 996, 50% solids) and 10 parts xylene were added. A clear solution was obtained without the addition of either an organoperoxide or heat, which produced a clear film on a glass plate when baked at around 100° C.

On the other hand, when the initial Isolene oil was added to the same commercial silicone resin in xylene solvent in the same proportions as in Example 1(i), a jelly-like product was obtained which would not form a clear solution.

(b) When 28 parts of the reaction products of Example 1(k) were mixed with 14 parts of the same commercial silicone resin varnish as used in Example 5(a) above, a jelly-like mass was formed. 3 parts di-tertiary butyl peroxide were added as an organoperoxide and the mixture was heated. Strong foaming was observed around 140° to 160° C. Heating was continued up to about 215° C. About 11 parts volatile substance had escaped, including the 7 parts solvent present in the silicone resin varnish and 3 parts of the organoperoxide. The product was clearly soluble in 32 parts toluene.

(c) 23 parts of the reaction product of Example 1(g) were mixed with 12 parts silicone resin varnish (DC 804, 60% solids) and 4 parts acetyl peroxide in dimethyl phthalate were used. Strong foaming occurred between 100° and 130° C. Heating was continued up to about 220° C. at which point vapor developed. 5 parts substance had escaped as volatile matter. The reaction product was a resinous, jelly-like mass of slight reddish appearance. Under boiling in 46 parts toluene, a clear solution was obtained. It was applied on Inconel panels, baked at 100° C., and clear, dry coating films were obtained.

(d) The product of Example 1(m) was compounded with a silicone resin, 26.5 g. being mixed with 20 parts commercial silicone resin solution (DC 803, 50%). The resins were not miscible and the silicone resin formed large agglomerations of jelly-like substance. As catalyst, 3 parts commercial cyclo-hydrocarbon hydroperoxide (Uniperox 60) were added. Boiling was observed around 110° C., and most of the gel went into solution. At 140° C., a few undissolved particles remained. Heating was discontinued, and the material was permitted to cool to around 80° C. 10 parts volatile substance had escaped. 2 parts Uniperox were added, and heating was continued up to around 190° C. 5 g. volatile matter had escaped. A reddish, clear melt was obtained which dissolved in 30 parts xylene. A solution was obtained which formed on a glass plate a clear film when dried at 100° C. for two hours. The film, after 16 hours at 100° C., remained somewhat soft when scratched with the fingernail, but was otherwise a dry film, even though a non-drying oil had been used.

(e) The product obtained in Example 1(o) was compounded by mixing 24 parts with 21 parts silicone resin (DC 801, 50% solution) and adding 2 parts tertiary-butyl perbenzoate. On mixing, a jelly-like mass was formed. At 140° C., no fusing had occurred. The amount of titanate was increased by cooling the mass to about 100° C. and adding 5 parts tertra-isopropyl titanate. Heating was continued to 160° C. 11 parts volatile matter had escaped. Upon adding 40 parts xylene, a reddish, transparent solution was obtained which was applied to a steel panel and dried in an oven at 100° C. into a dry coherent film.

(f) 30 parts of the product of Example 1(p) were mixed with 14 parts silicone resin solution (General Electric 9981–1). 2 parts tertiary-butyl hydroperoxide were added. A jelly-like mixture was obtained. Slow heating to 125° C. developed a uniform melt. After thinning with 20 parts benzol, it was applied to a steel panel and dried at 100° C. into a hard film. A clear solution was thus obtained without additional titanate being added.

1. The rate of reaction was increased by doubling the amount of organoperoxide, as follows: 30 parts of the reaction product of Example 1(p) were mixed with 14 parts silicone resin solution (General Electric 9981–1). 4 parts tertiary-butyl hydroperoxide were added. A jelly-like mixture was obtained. The rate of reaction was such that at 110° C., rapid solidification into incoherent, limited swelling particles occurred which were insoluble in coal tar solvents.

2. The preceding result was prevented by increasing the amount of titanate as follows: 30 parts of the reaction product of Example 1(p) were mixed with 14 parts silicone resin solution (General Electric 9981–1) and 10 parts of the same organotitanate were added in a 1:1 mixture of tetra-isopropyl titanate and butyl titanate mixture. 4 parts tertiary-butyl hydroperoxide were added. A jelly-like mixture was obtained. The reaction was very strong around 70° C. to 80° C., and quick fusing was observed. On further heating, solvent evaporation caused some foaming around 125° C. Heating was discontinued and 48 parts fused material was obtained and dissolved in 45 parts benzol. Complete dissolving occurred, and the material dried on a steel panel at 100° C. into a dry film. The solution itself did not increase in viscosity on standing for several hours.

(g) 21 parts of the reaction product of Example 1(r) were mixed with 9 parts silicone resin (DC 801, 60%), and 1 part Uniperox was added. A heavy jelly mass was obtained. On heating, gas development began around 100° C., and the material began to fuse. 2 parts butyl titanate were added, and the heating was continued until the whole material had been fused. On cooling, the product formed a rubbery mass which differed from a gel in that it was capable of being dissolved on heating with 20 parts of solvent (decahydronaphthalene). This solution was further diluted with twice the volume mineral spirits and a clear, reddish solution was obtained.

(h) 16.5 parts of the reaction product of Example 1(t) were mixed at around 70° C. with 5 parts silicone resin (General Electric 9989–1) and 0.5 part benzoyl peroxide (95% with stearic acid) were added. Slight gelling occurred, and on heating up to 160° C., 1.8 parts volatile matter escaped. The melt was thinned with 15 parts toluene under heating to the boiling point, and a clear solution was obtained, which gave on glass a clear flowout and dried at 100° C. in the oven in a film. On filtering, no residue remained.

1. 2 parts of the preceding product were thinned with 1 benzol and 1 part soybean oil were added. The mixture was shaken. No precipitation occurred on standing overnight.

(i) 10 parts of mixed oil-phenyl titanate compound of Example 1(u) were mixed with 5.2 parts silicone resin (DC 996, 50% solids). A heterogeneous mass was obtained with a jelly-like material floating on the surface of the melt. 0.95 part of lauroyl peroxide were added, and the mass was heated. Around 200° C., it fused uniformly. Heating was discontinued around 230° C. and a clear melt was formed. 3.55 parts volatile matter had escaped. The remainder was dissolved in 8 parts xylene, and a clear, reddish brown solution was formed which gave on glass a clear, cloudless flowout.

(k) 12 parts General Electric silicone resin solution, 81182 (about 60% solids in xylene), were added to the reaction mixture of Example 1(v) before all the peroxide had been used up, and the heating was continued. At first, the mixture was cloudy. Strong foaming occurred around 110° C. Heating was continued up to about 140° C. 4.5 parts volatile matter had escaped. 15 parts xylene were added as solvent, and a clear, stable solution was obtained.

(l) 20 parts of the reaction product produced in Example 1(w–1) were mixed with 11 parts cyclo-hexenyl polysiloxane in 45% solution, and 0.5 part hydroperoxide were added. At 130° C. strong foaming occurred. The resulting product was clearly soluble (1:0.7) in xylene and remained a stable solution when observed over a period of three days.

(m) The process of Example 1(w–1) were repeated with a silicone which contains an additional reactive vinyl group, Linde's Silicone X–31 (50% toluene), a vinyl-polysiloxane. The reactions of the present invention occurred, but care was required to obtain the reaction product in a soluble form. When greater amounts of peroxide were used, or a reaction temperature above about 120° C. to 155° C. was used, the reaction products turned directly into incoherent and limited swelling popcorn-like masses, as described in my pending application No. 33,676.

1. 30 parts of the initial reaction product of Example 1(w–2) were mixed with 10 parts silicone solution X–31. A mixed gel was formed. 2 g. cumene hydroperoxide were added and heated under foaming up to 155° C., whereby 5 g. volatile matter escaped. The product popped; that is, formed incoherent popcorn-like solids, and on adding 25 g. xylene, the incoherent solids were filtered off and further purified by solvent treatment.

2. 27 parts of the second reaction product of Example 1(w–2) were mixed with 11.5 g. vinyl-polysiloxane solution. Heating was continued slowly and kept below 130° C., throughout the reaction. The product was kept nearly completely from insolubilization. A vary light colored fluid was obtained. On adding 15 parts xylene, only 2 g. solid, incoherent particles were found on filtering. The solution remained stable on standing for three days.

3. 20 g. of the reaction product of Example 1(w–3) were used. 6.5 g. vinyl polysiloxane solution and 0.5 g. cumene hydroperoxide were added, and the vessel held between 65° C. and 85° C. At this low temperature, no complete reaction was reached, and some jelly siloxane remained at the bottom of the vessel.

The preceding three reactions show that vinyl-polysiloxane follows the process of this invention and that later secondary reactions of the vinyl group can be utilized. This is also demonstrated by Example 4(m).

(n) 23 parts of the reaction product of Example 1(y-2) were compounded with 10 parts of methyl phenyl silicone resin solution, commercial General Electric 81132 (60% solution), and a jelly mass was obtained on mixing. 1.5 parts butyl titanate and 1 part tertiary-butyl perbenzoate were added, and the mass was heated up to 185° C. A uniform melt was obtained and dissolved in 25 parts toluene. On filtering, only 0.7 part jelly substance remained on the filter cloth. After cooling, the solution developed a slightly waxy cloud.

*Example 6.—Compounding an alkyl titanate with a silicone resin and a polyhydric fatty acid ester*

Commercial silicone resins generally are not miscible with oils, but they can be co-reacted in the presence of alkyl titanates and free oxygen-releasing organoperoxides in accordance with the present invention.

(a) 20.5 parts silicone resin (DC 801, 60% solution) were slowly heated to drive off the solvent. 9.2 parts soybean oil were added along with 5 parts butyl titanate and 2 parts di-tertiary-butyl peroxide. The mixture was not uniformly miscible. On heeating, a slight gas development began around 85° C. and the components began to mix. At around 110° C., uniform liquid compound was obtained which was clearly soluble (1:0.7) in zenzol. This solution remained clear on cooling. A sample was spread over a glass plate, and no cloudiness was observed. It baked into a clear, hard coating on the glass at around 110° C.

(b) 22 parts silicone resin (DC 801, 60% solution) were mixed with 10 parts tetra-cyclohexyl titanate and 14 parts China woodoil. 4 parts of tertiary-butyl perbenzoate were used. The mixture was not uniform and the materials were not compatible. On heating, a heavy reaction occurred around 150° C., and heating was continued up to about 185° C. On cooling, a heavy uniform compound was obtained having the appearance of a soft resin. 8 g. was lost in the form of solvent from the silicone solution and volatiles of the per compound. The new resin reaction product was soluble in coal tar solvents and dissolved in 39 parts xylene. When applied to a steel panel and exposed to a temperature of about 100° C., a continuous film was obtained within 90 minutes. The solution was miscible with the solution of the compounds produced in Example 1(h), Example 2(c) and Example 4(e).

(c) 15 parts silicone resin (DC 996), 50% solids, were mixed with 9 parts tetra-cyclohexanol titanate and 10 parts of a non-drying vegetable oil, teaseed oil. 2 parts di-tertiary-butyl peroxide were used. A clear, soluble compound was obtained on heating the mixture to 165° C. A 1:1 solution in toluene was light in color. This solution remained clear on standing for 60 hours. It was further diluted (1:1) with xylene, and this diluted solution was again mixed (1:1) with butyl titanate. No precipitation occurred. The (1:1) solution of the new compound in solvent was mixed (2:1) with liquid cobalt octoate drier and 1 part VMP naphtha solvent was added. The solution remained clear.

As a medium for further modification, the (1:1) solution of the compound in solvent was mixed (1:1) with ethyl tri-ethoxy silane, and a clear solution was obtained. This was miscible (3:1) with soybean oil.

(d) 10 parts thermoplastic silicone resin (General Electric 9989-1) were mixed with 10 parts soybean oil and 10 parts butyl titanate. 2.8 parts of organic liquid hydroperoxide (Uniperox 60) were used. The mixture was not uniform. On heating, strong foaming occurred, especially around 150° C. to 160° C. Heating was discontinued at around 192° C. 6 parts volatile substance had evaporated. The compound was clearly soluble in a mixture of 10 parts xylene and 20 parts VMP naphtha solvent. This solution was compatible on mixing with equal parts by volume of butyl titanate and ethyl tri-ethoxy silane and mixtures thereof, as a base for further modification.

(e) 11.5 parts of a semi-drying vegetable oil, perilla oil, were mixed with 21.5 parts silicone resin solution (DC 801, 50% solution). Neither was compatible and a slight gel was formed. 10 parts tetra-isopropyl titanate were added and mixed, but were not compatible. 2 parts 95% benzoyl peroxide with 5% stearic acid were added and the mixture was heated. Around 100° C., gas formation was observed. Heating was discontinued at around 145° C. when a drop of the compound on a glass plate gave a uniform clear mass. 6 g. volatile matter had escaped. 30 parts toluene were added, and a clear solution was obtained which remained clear on standing several hours. This solution dried on a glass plate overnight at 100° C. into a dry, transparent film.

(f) One volume silicone resin (General Electric 81132, 60% solution in coal tar solvent) was mixed with one volume synthetic drying oil (Isoline G-H, Woburn Chemical). The silicone was precipitated.

1. 21.5 g. silicone resin (General Electric 81132, 60% solution) were mixed with 10 g. of the same synthetic drying oil and with 12 g. butyl titanate. 2 g. lauroyl peroxide were added. On mixing, a non-uniform condition was obtained, including a strong insoluble gel. On heating to 100° C., the peroxide began to react under gas formation. Heating was continued under stirring. Around 125° C. to 130° C., the mass turned into a uniform melt. Heating was continued to about 150° C. 8 parts volatile matter had escaped. The material was thinned with 23 parts toluene and a very clear, light colored, slightly yellowish and reddish, stable solution was obtained. It was fully transparent and free of cloudiness.

(g) 5 parts phenol titanate were melted slowly with 4.5 parts of a semi-drying oil, soybean oil. A non-uniform solution was obtained as a cloudy suspension. 4 parts commercial silicone resin (DC 803, 50%) were added, along with 1 part tertiary-butyl hydroperoxide. Around 110° C., a strong foaming occurred, and a dark melt was observed with a floating gel. On further heating around 200° C. to 240° C., nearly all the jelly mass had melted and was dissolved in 10 parts xylene. On filtering, around 0.5 g. residue was found. The remaining material was dissolved and a stable, dark reddish-brown solution was obtained.

(h) 11 parts natural beeswax were melted and mixed with 10 parts butyl titanate and 11 parts of 60% methyl phenyl silicone resin solution (DC 801) were added. As organoperoxide, 2 parts di-tertiary-butyl peroxide were added. On heating, a fully uniform melt was obtained between 110° C. and 140° C. This was dissolved in 20 parts toluene, and nothing remained on the filter cloth. On standing, at room temperature, the solution formed a slight waxy cloudy appearance.

(i) 11 parts of a synthetic wax-like liquid matter, polyethylene glycol 400 di-tri-ricinoleate, were mixed with 11 parts butyl titanate and 12 parts cyclo-hexenyl polysiloxane solution (Linde X-32). As organoperoxide, 2.5 parts tertiary-butyl hydroperoxide were added. Strong reaction occurred between 110° C. and 115° C., and 7 parts volatile matter escaped. The compound was dissolved (1:1) in toluene without residue and a very light colored and clear warm solution was obtained which remained clear on standing for five hours at room temperature.

*Example 7.—Modifying compounds prepared from alkyl titanate with polyhydric alcohol fatty acid esters and/or silicone resins.*

In a number of examples given throughout the specification, it has been shown that the instant new compounds can be further combined with other oils, resinous materials, driers, colored or pigment matter, and with various modifying agents. This may be accomplished by either mixing the new product or its solution with the additional modifying matter or its solution with or without heating. The resulting materials can be modified further by adding more of the new compounds or by increasing the alkyl titanate content.

(a) The reaction product of Example 1(e) was applied to a glass plate and baked at room temperature. It reached a Sward Hardness of 24 in two days, at 20° C. When baked at 110° C. for two days, its Sward Hardness at 20° C. was 40, and it did not become soft or tacky when covered with transformer oil for 2½ hours at 110° C.

The reaction product of Example 1(d) had a Sward Hardness of 26 when baked at 110° C., indicating good drying characteristics. A coating thereof on tin plate showed a tendency to form fine cracks when observed under the microscope, indicating a need for greater coherence. Modification thereof was accomplished as follows:

1. 10 parts in 50% solution were mixed with 5 parts Chinawood oil, applied to tinned sheet metal and baked at 100° C. for 2 hours. Dry coatings were obtained. On ageing for 14 hours at 100° C., the films had a Sward Hardness of 20 and did not show any tendency to crack. The solution remained stable under observation for several days.

2. A plasticizer was used in the compound prepared in Example 1(d) as follows:

11 parts of the compound in 50% solution were mixed with 4.5 parts tricresylphosphate and a stable solution was obtained. This film, in view of the very high amount of plasticizer used for determining the compatibility, had a Sward Hardness of 4.

3. 10 parts of the solution of Example 1(d) with 50% solids were mixed with a commercial alkyd resin of the soya oil modified type having 50% solids (Rezyl 310-5). The materials produced, on baking on the same sheet metal under the same curing conditions, a Sward Hardness of 18.

The reaction product of Example 1(i) was mixed with China-wood oil and a naphthenate drier, and dissolved (10:17) in alkyd resin (Rezyl 99-5, 60% solids), an alkyd based upon a phthalic anhydride content of 43% and using a modifying oil of the non-drying oil type. 10 parts xylene were added as diluent. On warming the mixture, a clear, stable solution was obtained. On mixing similar portions of the same alkyd resin together with the initial oil and xylene, no clear solution was obtainable.

4. The reaction product of Example 6(c) was modified with ethyl tri-ethoxy silane and soybean oil was added to the solution. Similarly, liquid drier was substituted for the organosilane. Similar solutions were made up with the reaction product of Example 6(d) and additional alkyl titanate was added as a modifier. Similarly, the reaction product of Example 4(g) was modified with amyl tri-ethoxy silane and also with additional alkyl titanate. Likewise, the compound of Example 1(l) was mixed with ethyl trichloro silane.

In the processes set forth in Example 7, the alkyl titanates are used in a non-hydrolyzed form. If hydrolyzation occurs (caused by the use of hydrogen peroxide), a portion of the reaction product is transformed into an insoluble mass which cannot be resolubilized with metal soaps. Accordingly, the present specification and the appended claims specifically exclude hydrogen peroxide, an inorganic peroxide, from the free oxygen-yielding compounds which are useful in the practice of the present invention.

*Example 8.—Effect of urea hydrogen peroxide on methyl titanate*

Methyl titanate is a white, granular solid material without a practical degree of solubility in oils, toluene, cyclohexanol, methyl isobutyl ketone, isopropenyl acetate, etc. Methyl alcohol affects it sufficiently to permit the particles to powder to fine size, but no clear solution is obtainable.

(a) 2 parts of methyl titanate were mixed with 3 parts of castor oil wetted with 2 parts methyl alcohol. 1.2 g. urea peroxide were added, and at 25° C. a yellow reaction product appeared and the methyl titanate granular particles fell into a very fine state. Complete liquefaction did not occur, and a fine yellow sedimentation began to appear. 0.5 part urea peroxide was added and the temperature was increased to 45° C. 2 parts of castor oil were added to complete the reaction. A yellow substance was formed, but the fine sedimentation remained. In spite of the fact that castor oil is soluble in toluene, the reaction product was taken up in toluene, filtered and the clear toluene solution was allowed to evaporate, a waxy product being obtained.

(b) 2 parts of butyl titanate were used and the same kind of sedimentation was formed in this case with urea peroxide, in spite of the fact that butyl titanate is much more resistant to decomposition than methyl titanate in contact with moisture.

*Example 9.—Effect of organoperoxides on methyl titanate*

In order to produce a more uniform area for inter-reaction, the following methods were used to establish that the methyl titanate reacts with the oil in the presence of organoperoxide.

(a) 5 parts methyl titanate were wetted with 10 parts methyl alcohol and ground fine with a pestle. 8.5 parts China-wood oil were added and mixed with 1.5 parts tertiary-butyl perbenzoate. The mixture was heated under stirring. The methyl alcohol evaporated and the material became yellowish. At 140° C. 9 parts volatile matter had escaped. Since no clear melt had been obtained, 5 parts commercial lead octoate liquid (24% Pb), a metal soap, were added and heating continued. The product turned solid around 165° C. and was insoluble in toluene.

(b) The test was repeated, using 3 parts methyl titanate, 6 parts methyl alcohol, 9 parts bodied linseed oil (Z 2) and 1.2 parts tertiary-butyl perbenzoate. The test proceeded in the same way. At 140° C., 3.5 parts lead octoate liquid were added. At 170° C., a solid yellow to locally slight brown mass was obtained, which showed a greater degree of coherence than the product of the preceding Example (a).

(c) In order to retard the co-reaction further, 3 parts methyl titanate were ground with 8 parts tricresylphosphate and 7 parts of bodied linseed oil were added. After grinding, 2 parts tertiary-butyl hydroperoxide were added. Around 130° C., violent reaction occurred, although the vessel had been removed from the heat source at around 120° C. A solid reaction product was obtained.

*Example 10.—Separation of a waxy reaction product of methyl titanate and polyhydric alcohol fatty acid esters with organoperoxides by separation of the soluble portion from the insoluble hydrolyzation product.*

(a) 6 g. methyl titanate were mixed with 5 g. castor oil and moistened with 3 g. methyl alcohol. The titanate was broken up into a powder in the fluids. 1 g. lauroyl peroxide was added and the mixture was slowly heated. A reaction occurred around 75° C., whereby a yellowish-brown color appeared. An incomplete melt was obtained and in 1:1 toluene solution, a colored solution was obtained above a cloudy settled layer.

The same test was repeated using cumene hydroperoxide and thinning with a 1:1 mixture of methyl alcohol and toluene. After evaporating this volatile matter, a waxy mass was obtained.

(b) 10 g. methyl titanate were mixed with 12 g. of a 45% toluene solution of Linde's Silicone X-32, a cyclohexenyl polysiloxane. 2 g. cumene hydroperoxide were added. On heating, a yellowish-brown color appeared. Partial melting occurred, but a fine sediment was formed. The product was thinned with 10 g. xylene and separated by filtering. The solution was allowed to evaporate and a waxy mass was obtained.

(c) The test of (b) above was repeated, using Linde's Silicone X-31, a vinyl polysiloxane, 50% in toluene. A strong reaction occurred on heating, and a black, mostly solid matter was formed.

(d) The attempt was made to eliminate partial hydrolysis by first heating a mixture of 18 g. linseed oil (Z-2) and 0.5 g. cumene hydroperoxide to 70° C. and then adding 0.5 g. finely powdered methyl titanate and heating up to 180° C. A strong reaction occurred, and a fine powder in yellowish-brown color was observed.

(e) Mixtures of methyl titanate and butyl titanate were tried also with soybean oil and butyl perbenzoate, but full elimination of the sedimentation was not accomplished.

Thus, Example 10 illustrates that methyl titanate will co-react with polyhydric alcohol fatty acid esters or silicones, or mixtures thereof, but it is not possible to avoid partial hydrolysis of the reaction product.

Accordingly, it will be apparent that the present invention makes possible the production of new and useful reaction products having particular value as film forming materials, waterproofing agents, etc. Further, the present invention makes possible the compounding, formulating and application of impregnations, resin coatings, varnishes, paints, etc. The present compounds are highly heat-resistant but are easily cured and are surprisingly more-compatible with other coating compounds than are the conventional silicone resins. It will be apparent that further modifications and departures may be made by those skilled in the art, and it is intended that all such variations be included as coming within the spirit and scope of the appended claims.

I claim as my invention:

1. A composition of matter comprising the reaction product of an ester of titanic acid, and an organic compound selected from the group consisting of esters of polyhydric alcohols with fatty acids having from 10 to 31 carbon atoms and monovalent hydrocarbon poly-siloxane resins, said reactants being reacted in the presence of an organoperoxide at a temperature sufficient to effect the release of free oxygen therein, said reaction product being soluble in coal-tar solvents and capable of forming a stable solution.

2. A composition of matter comprising the reaction product of an ester of titanic acid, and an ester of a polyhydric alcohol with a fatty acid having from 10 to 31 carbon atoms, said reactants being reacted in the presence of an organoperoxide at a temperature sufficient to effect the release of free oxygen therein, said reaction product being soluble in coal-tar solvents and capable of forming a stable solution therein.

3. A composition of matter comprising the reaction product of an ester of titanic acid, and a monovalent hydrocarbon poly-siloxane resin, said reactants being reacted in the presence of an organoperoxide at a temperature sufficient to effect the release of free oxygen therein, said reaction product being soluble in coal-tar solvents and capable of forming a stable solution.

4. The composition set forth in claim 1 wherein the ester of titanic acid comprises butyl titanate.

5. The composition set forth in claim 2 wherein the fatty acid ester of a polyhydric alcohol comprises linseed oil.

6. The composition of claim 3 wherein the poly-siloxane resin comprises methyl phenyl poly-siloxane resin.

7. The composition of claim 1 wherein the organoperoxide comprises di-tertiary-butyl peroxide.

8. A process for the preparation of organotitanate reaction products which comprises reacting an ester of titanic acid with an organic compound selected from the group consisting of esters of polyhydric alcohols with fatty acids having from 10 to 31 carbon atoms and monovalent hydrocarbon poly-siloxane resins in the presence of an organoperoxide at a temperature sufficient to effect the release of free oxygen therein to obtain organotitanate reaction products which are soluble in coal-tar solvents and capable of forming a stable solution.

9. A process for the preparation of organotitanate reaction products which comprises reacting an ester of titanic acid with an ester of a polyhydric alcohol with a fatty acid having from 10 to 31 carbon atoms in the presence of an organoperoxide at a temperature sufficient to effect the release of free oxygen therein to obtain organotitanate reaction products which are soluble in coal-tar solvents and capable of forming a stable solution.

10. The process set forth in claim 9 wherein the ester of titanic acid comprises butyl titanate.

11. The process set forth in claim 9 wherein the fatty acid ester of polyhydric alcohol comprises linseed oil.

12. The process set forth in claim 9 wherein the organoperoxide comprises di-tertiary-butyl peroxide.

13. A process for the preparation of organotitanate reaction products which comprises reacting an ester of titanic acid with a monovalent hydrocarbon poly-siloxane resin in the presence of an organoperoxide at a temperature sufficient to effect the release of free oxygen therein to obtain organotitanate reaction products which are soluble in coal-tar solvents and capable of forming a stable solution.

14. The process set forth in claim 13 wherein the ester of titanic acid comprises butyl titanate.

15. The process set forth in claim 13 wherein the poly-siloxane resin comprises methyl phenyl poly-siloxane resin.

16. The process is set forth in claim 13 wherein the organoperoxide comprises di-tertiary-butyl peroxide.

17. A process for the preparation of organotitanate reaction products which comprises reacting an ester of titanic acid with an ester of a polyhydric alcohol with a fatty acid having from 10 to 31 carbon atoms and a monovalent hydrocarbon poly-siloxane resin in the presence of an organoperoxide at a temperature sufficient to effect the release of free oxygen therein to obtain organotitanate reaction products which are soluble in coal-tar solvents and capable of forming a stable solution.

18. A composition of matter comprising the reaction product of an ester of titanic acid, an ester of a polyhydric alcohol with a fatty acid having from 10 to 31 carbon atoms and a monovalent hydrocarbon poly-siloxane resin, said reactants being reacted in the presence of an organoperoxide at a temperature sufficient to effect the release of free oxygen therein, said reaction product being soluble in coal-tar solvents and capable of forming a stable solution.

19. A composition of matter comprising the reaction product of butyl titanate, soyabean oil, and methyl phenyl polysiloxane resin, said reactants being reacted in the presence of di-tertiary-butyl peroxide at a temperature sufficient to effect the release of free oxygen therein, said reaction product being soluble in coal-tar solvents and capable of forming a stable solution therein.

20. The composition of matter set forth in claim 1 wherein the amount of organoperoxide comprises from about 1 to 25 per cent by weight of the non-volatiles.

21. The process set forth in claim 8 wherein the amount of organoperoxide comprises from about 1 to 25 per cent by weight of the non-volatiles.

22. The process set forth in claim 17 wherein the amount of organoperoxide comprises from about 6 to 23 per cent by weight of the non-volatiles.

23. The process set forth in claim 9 wherein the amount of organoperoxide comprises from about 2.4 to 20 per cent by weight of the non-volatiles.

24. The process set forth in claim 13 wherein the amount of organoperoxide comprises from about 1.6 to 13.5 per cent by weight of the non-volatiles.

25. The process set forth in claim 8 wherein the reacting temperature is from about 90 to 220° C.

26. A process for the preparation of organotitanate reaction products which comprises reacting an ester of titanic acid with an organic compound selected from the group consisting of esters of polyhydric alcohols with fatty acids having from 10 to 31 carbon atoms and monovalent hydrocarbon poly-siloxane resins in the presence of an organoperoxide at a temperature from about 90 to 135° C. sufficient to effect the release of free oxygen therein and thereafter continuing the reaction at a temperature from about 140 to 220° C. to obtain organotitanate reaction products which are soluble in coal-tar solvents and capable of forming a stable solution.

References Cited in the file of this patent

UNITED STATES PATENTS

| Number | Name | Date |
|---|---|---|
| 2,512,058 | Gulledge | June 20, 1950 |
| 2,620,318 | Boyd et al. | Dec. 2, 1952 |

OTHER REFERENCES

Kraitzer et al., J. Oil & Colour Chemists' Assn. 31, No. 340, pages 405–417 (1948).